(12) United States Patent
Hiraiwa et al.

(10) Patent No.: US 8,865,367 B2
(45) Date of Patent: Oct. 21, 2014

(54) GAS DECOMPOSITION COMPONENT

(75) Inventors: Chihiro Hiraiwa, Osaka (JP); Masatoshi Majima, Itami (JP); Tetsuya Kuwabara, Osaka (JP); Tomoyuki Awazu, Itami (JP); Toshio Ueda, Itami (JP); Toshiyuki Kuramoto, Itami (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 55 days.

(21) Appl. No.: 13/702,246

(22) PCT Filed: Jun. 6, 2011

(86) PCT No.: PCT/JP2011/062884
§ 371 (c)(1),
(2), (4) Date: Dec. 5, 2012

(87) PCT Pub. No.: WO2011/155421
PCT Pub. Date: Dec. 15, 2011

(65) Prior Publication Data
US 2013/0089806 A1  Apr. 11, 2013

(30) Foreign Application Priority Data
Jun. 7, 2010  (JP) ................. 2010-130555

(51) Int. Cl.
*H01M 8/12* (2006.01)
*H01M 8/02* (2006.01)
*C25B 9/00* (2006.01)
*B01D 53/32* (2006.01)
*C25B 1/00* (2006.01)

(52) U.S. Cl.
CPC ................ *H01M 8/122* (2013.01); *C25B 9/00* (2013.01); *B01D 2255/20753* (2013.01); *B01D 2255/20707* (2013.01); *B01D 2257/406* (2013.01); *Y02E 60/525* (2013.01); *H01M 8/1213* (2013.01); *B01D 2255/20738* (2013.01); *Y02E 60/521* (2013.01); *B01D 53/326* (2013.01); *H01M 8/0258* (2013.01); *B01D 2255/104* (2013.01); *C25B 1/00* (2013.01); *H01M 8/1206* (2013.01); *B01D 2257/708* (2013.01); *B01D 2258/0216* (2013.01); *B01D 2257/404* (2013.01)
USPC ........... 429/483; 429/480; 429/481; 429/495; 429/496; 429/497; 429/504

(58) Field of Classification Search
USPC .......... 429/480, 481, 483, 497, 504; 204/242, 204/252, 262, 263, 272, 274
See application file for complete search history.

(56) References Cited

U.S. PATENT DOCUMENTS

2005/0255375 A1* 11/2005 Xie ................................. 429/44
2008/0274390 A1* 11/2008 Ueda et al. ...................... 429/34

(Continued)

FOREIGN PATENT DOCUMENTS

| CN | 101440499 A | 5/2009 |
|---|---|---|
| CN | 101649464 A | 2/2010 |

(Continued)

*Primary Examiner* — Gregg Cantelmo
(74) *Attorney, Agent, or Firm* — Drinker Biddle & Reath LLP

(57) ABSTRACT

Provided is a gas decomposition component that employs an electrochemical reaction and can have high treatment performance, in particular, an ammonia decomposition component. The gas decomposition component includes a MEA 7 including a solid electrolyte 1 and an anode 2 and a cathode 5 that are disposed so as to sandwich the solid electrolyte; Celmets 11s electrically connected to the anode 2; a heater 41 that heats the MEA; and an inlet 17 through which a gaseous fluid containing a gas is introduced into the MEA, an outlet 19 through which the gaseous fluid having passed through the MEA is discharged, and a passage P extending between the inlet and the outlet, wherein the Celmets 11s are discontinuously disposed along the passage P and, with respect to a middle position 15 of the passage, the length of the Celmets disposed is larger on the side of the outlet than on the side of the inlet.

16 Claims, 10 Drawing Sheets

(56) References Cited

U.S. PATENT DOCUMENTS

2013/0084514 A1 4/2013 Hiraiwa et al.
2013/0089810 A1 4/2013 Hiraiwa et al.

FOREIGN PATENT DOCUMENTS

| | | |
|---|---|---|
| JP | 53-11185 | 2/1978 |
| JP | 54-10269 | 1/1979 |
| JP | 57-187020 | 11/1982 |
| JP | 61-68120 | 4/1986 |
| JP | 7-31966 | 2/1995 |
| JP | 7-116650 | 5/1995 |
| JP | 11-347535 | 12/1999 |
| JP | 2001-518688 A | 10/2001 |
| JP | 2003-45472 | 2/2003 |
| JP | 2004-332047 | 11/2004 |
| JP | 2006-175376 | 7/2006 |
| JP | 2006-231223 | 9/2006 |
| JP | 2006-294285 A | 10/2006 |
| JP | 2008053032 A * | 3/2008 |
| JP | 2010-100929 A | 5/2010 |
| JP | 2010-140895 A | 6/2010 |
| JP | 2010-159472 A | 7/2010 |
| JP | 2010-172828 A | 8/2010 |
| JP | 2010-180789 A | 8/2010 |
| WO | 2010/035691 | 4/2010 |

* cited by examiner

POSITION IN PASSAGE IN MEA

11a

11a

CYLINDRICAL MEA

OUTER CIRCUMFERENTIAL
SURFACE OF CATHODE

GAS DECOMPOSITION COMPONENT

TECHNICAL FIELD

The present invention relates to a gas decomposition component; specifically, to a gas decomposition component that can efficiently decompose a predetermined gas.

BACKGROUND ART

Although ammonia is an essential compound in agriculture and industry, it is hazardous to humans and hence a large number of methods for decomposing ammonia in water and the air have been disclosed. For example, a method for removing ammonia through decomposition from water containing ammonia at a high concentration has been proposed: aqueous ammonia being sprayed is brought into contact with airflow to separate ammonia into the air and the ammonia is brought into contact with a hypobromous acid solution or sulfuric acid (Patent Literature 1). Another method has also been disclosed: ammonia is separated into the air by the same process as above and the ammonia is incinerated with a catalyst (Patent Literature 2). Another method has also been proposed: ammonia-containing wastewater is decomposed with a catalyst into nitrogen and water (Patent Literature 3). In general, waste gas from semiconductor fabrication equipment contains ammonia, hydrogen, and the like. To completely remove the odor of ammonia, the amount of ammonia needs to be reduced to the ppm order. For this purpose, a method has been commonly used in which waste gas to be released from semiconductor fabrication equipment is passed through scrubbers so that water containing chemicals absorbs the hazardous gas. On the other hand, to achieve a low running cost without supply of energy, chemicals, or the like, a treatment for waste gas from semiconductor fabrication equipment has been proposed: ammonia is decomposed with a phosphoric acid fuel cell (Patent Literature 4).

CITATION LIST

Patent Literature

PTL 1: Japanese Unexamined Patent Application Publication No. 7-31966
PTL 2: Japanese Unexamined Patent Application Publication No. 7-116650
PTL 3: Japanese Unexamined Patent Application Publication No. 11-347535
PTL 4: Japanese Unexamined Patent Application Publication No. 2003-45472

SUMMARY OF INVENTION

Technical Problem

As described above, ammonia can be decomposed by, for example, the method of using a chemical solution such as a neutralizing agent (PTL 1), the incineration method (PTL 2), or methods employing thermal decomposition reactions with catalysts (PTL 3). However, these methods have problems that they require chemicals and external energy (fuel) and also require periodic replacement of the catalysts, resulting in high running costs. In addition, such an apparatus has a large size and, for example, it may be difficult to additionally install the apparatus in existing equipment in some cases.

As for the apparatus in which a phosphoric acid fuel cell is used to detoxify ammonia in waste gas from compound semiconductor fabrication (PTL 4), intensive efforts are not made for addressing an increase in pressure loss, an increase in electric resistance, and the like, which inhibit enhancement of the detoxification capability. When an electrochemical reaction is used to detoxify ammonia or the like, unless a novel structure is used to suppress, for example, an increase in pressure loss and an increase in electric resistance between electrode/collector under high-temperature environments, high treatment performance on the practical level cannot be achieved. Thus, the apparatus has still remained just an idea.

An object of the present invention is to provide a gas decomposition component that employs an electrochemical reaction and can have high treatment performance; in particular, an ammonia decomposition component for ammonia; a power generation apparatus including a power generation component among the above-described decomposition components; and an electrochemical reaction apparatus.

Solution to Problem

A gas decomposition component according to the present invention is used for decomposing a gas. This component includes a membrane electrode assembly (MEA) including a solid electrolyte and a first electrode and a second electrode that are disposed so as to sandwich the solid electrolyte; a porous metal body electrically connected to the first electrode or the second electrode; a heater that heats the MEA; and an inlet through which a gaseous fluid containing the gas is introduced into the MEA, an outlet through which the gaseous fluid having passed through the MEA is discharged, and a passage extending between the inlet and the outlet, wherein the porous metal body is discontinuously disposed along the passage and, with respect to a middle position of the passage, a length of the porous metal body disposed is larger on a side of the outlet than on a side of the inlet.

The solid electrolyte serving as a main component of the MEA is used to pass ions therethrough. When the temperature of the solid electrolyte is close to room temperature, the permeation rate of ions is low and gas decomposition performance on the practical level cannot be achieved. That is, in general, the amount of ions permeating the solid electrolyte limits the reaction rate. Accordingly, an electrochemical reaction apparatus including the MEA is heated with a heater or the like to 300° C. to 1000° C. The higher the temperature, the higher the permeation rate of ions becomes. Accordingly, high temperatures are preferred; however, use of materials and structures that have high heat resistance becomes necessary, resulting in an increase in the cost. Thus, an appropriate temperature is employed. Even when a heater is used for heating, because of the low temperature of the gaseous fluid introduced or the influence of the entrance end of the heater, the following temperature distribution is commonly provided: the temperature is low in a region near the inlet, increases toward the central region, and decreases in a region near the outlet due to the influence of the exit end of the heater. That is, in the passage, the temperature becomes higher in the region extending from the middle position to the outlet than in the region extending from the inlet to the middle position. As described above, the electrochemical reaction for gas decomposition proceeds at a high reaction rate in a high-temperature region. That is, in a high-temperature region, the gas decomposition proceeds with high treatment performance. The current generated in the gas decomposition reaction also becomes large in a high-temperature region in which the gas decomposition is promoted.

The porous metal body, which functions as a collector, also plays a role that the gaseous fluid containing the gas to be decomposed is prevented from passing without being treated and the gaseous fluid is brought into contact with the first electrode or the second electrode. To achieve both functions of current collection and prevention of the gaseous fluid from passing without being treated, the porous metal body has a porosity and a pore size that are at least on the predetermined level and has an electrical conductivity that is at least on the predetermined level. However, even when the porous metal body has a porosity and a pore size that are at least on the predetermined level, the porous metal body disposed from the inlet to the outlet over the entire length of the passage causes a serious increase in the pressure loss. This increase in the pressure loss is a large factor that prevents the treatment performance of a gas decomposition component employing an electrochemical reaction from reaching the practical level.

In the above-described configuration according to the present invention, since the porous metal body is discontinuously disposed along the passage, a considerable decrease in the pressure loss can be suppressed. The porous metal body is disposed such that the length of the porous metal body in the region extending from the middle position to the outlet is larger than in the region extending from the inlet to the middle position, the former region having a higher temperature than the latter region. Accordingly, the porous metal body is selectively disposed in the region in which the electrochemical reaction proceeds at a high rate. As a result, while the electric resistance is kept low so that the electrochemical reaction proceeding at a high rate is not inhibited, an increase in the pressure loss can be suppressed.

Here, the length of the porous metal body disposed in such a region (extending from the inlet to the middle position or extending from the middle position to the outlet) is the total length of the porous metal body in the region.

Note that the predetermined gas to be decomposed may be a single component or two or more components. Although the electrochemical reaction preferably results in decomposition (electrochemical reaction) of two or more components, it will suffice that at least one component of the predetermined gas is decomposed. The second gaseous fluid may be composed of a single component or may contain two or more components.

The porous metal body is preferably disposed in a region that is separated from the inlet by at least $1/5$ or more of a total length of the passage. As described above, the passage in the region near the inlet has a low temperature due to the low temperature of the gaseous fluid transferred from the outside and the influence of the end portion of the heater. Accordingly, the gas decomposition reaction rate is low in the region near the inlet. Thus, even when the porous metal body is disposed in the region near the inlet, it merely contributes to an increase in the pressure loss and substantially does not provide the current-collection function. In the region that extends from the inlet to a position separated from the inlet by about $1/5$ of the total length of the passage, since the temperature is not sufficiently high, the collector is substantially not necessary. In the above-described configuration, since the porous metal body is not disposed in the region in which the collector is not necessary, the current-collection function is not inhibited and the pressure loss can be decreased.

The porous metal body discontinuously disposed may have a total length that is $1/10$ to $5/10$ of a total length of the passage. In this case, the porous metal body is disposed at a higher density on the outlet side than on the inlet side, the outlet side having a higher temperature than the inlet side. Thus, while current collection can be effectively achieved with a short length of the porous metal body and the pressure loss can be decreased. When the total length of the porous metal body is less than $1/10$ of the total length of the passage, current collection is not sufficiently achieved and the electrochemical reaction is inhibited; on the other hand, when it is more than $5/10$, the pressure loss becomes excessively high.

The porous metal body discontinuously disposed may have different average pore sizes depending on positions where the porous metal body is disposed. In this case, for example, a porous metal body having large pores is disposed on the near-inlet side (where the electrochemical reaction rate is relatively low) so that a low pressure loss is achieved and a current-collecting capability to a degree is provided, whereas a porous metal body having small pores is disposed on the near-outlet side (where the electrochemical reaction rate is high) so that a relatively high current-collecting capability can be provided while a pressure loss to a degree is caused.

The porous metal body may be a metal-plated body. In this case, a porous metal body having a high porosity can be obtained and the pressure loss can be suppressed. In a metal-plated porous body, the skeleton part is formed by plating with metal (Ni). Accordingly, the thickness can be easily adjusted to be small and hence a high porosity can be easily achieved.

A metal mesh sheet and/or metal paste may be disposed between the first electrode or the second electrode and the porous metal body.

In this configuration, the metal mesh sheet and/or metal paste and the porous metal body constitute the collector. When the metal mesh sheet and/or metal paste is not used, the porous metal body is electrically connected to, for example, the first electrode through direct contact therebetween. In the contact between the porous metal body and the first electrode or the second electrode, a sufficiently large contact area is less likely to be provided. Accordingly, when electrical connection is established by direct contact between the porous metal body and the electrode, the contact resistance becomes high, resulting in an increase in the electric resistance between the electrode and the collector. An increase in the electric resistance of the collector results in degradation of the electrochemical-reaction performance.

In contrast, by using the metal mesh sheet and/or metal paste, the contact resistance can be decreased in the following manner. (1) In the case of the metal mesh sheet, since it has the shape of a single sheet, it naturally comes in contact with the electrode so as to conform to the electrode surface. As a result of, for example, application of an external force for increasing the degree of filling, the metal mesh sheet and the porous metal body conform to each other and protrude to the electrode, resulting in an increase in the contact area with the electrode. At the contact interface between the metal mesh sheet and the porous metal body, the metal dendritic structures are pressed against each other and enter each other's pores to thereby achieve contact with each other. Accordingly, a low contact resistance is maintained. (2) In the case of the metal paste, since the metal paste applied has plasticity, even in portions where the porous metal body is slightly separated from the electrode, the metal paste fills the gaps to thereby establish electrical connection. Accordingly, low-resistance electrical connection between the electrode and the porous metal body can be very easily established.

As described above, by using a metal mesh sheet or metal paste, the overall electric resistance of the electrode collector can be made low. Accordingly, even when the porous metal body is disposed not continuously but discontinuously in the passage, a collector having a sufficiently low electric resistance can be formed. As a result, by decreasing the total length of the porous metal body, the pressure loss of the gaseous fluid passing through this portion can be made low. At this time, the porous metal body is disposed at a higher density in the region extending from the middle position to the outlet than on the inlet side, the region having a high temperature in which the electrochemical reaction tends to occur at a high rate; accordingly, efficient current collection can be performed.

Although the metal mesh sheet may be any sheet such as a woven fabric, a nonwoven fabric, or a perforated sheet, it is preferably a woven fabric in view of, for example, flexibility and uniform distribution of pore size. Preferred examples of the metal material include Ni, Ni—Fe, Ni—Co, Ni—Cr, and Ni—W. The mesh sheet may have a structure in which a plated layer is composed of such a metal. For example, an Fe woven fabric plated with Ni may be used; it forms an alloy by heating, that is, Ni—Fe alloy. In bonding of such a metal or an alloy to the first electrode, a reducing atmosphere for the metal forming the mesh sheet can be relatively easily achieved without employing very strict sealing conditions. Thus, reduction bonding can be readily performed. In particular, Ni—W and the like have excellent catalysis and can promote decomposition of, for example, ammonia.

The following configuration may be employed: the MEA has a cylindrical body; the first electrode is disposed on an inner-surface side of the cylindrical body and the second electrode is disposed on an outer-surface side of the cylindrical body; the first electrode faces the passage; and the porous metal body is disposed in the passage, as a collector for the first electrode. By forming the MEA as a cylindrical body, the MEA composed of fragile ceramic can be formed so as to have a stable strength and not to be damaged during processing even when the processing accuracy is not relatively high. In general, since a gaseous fluid containing a gas to be detoxified such as ammonia is introduced on the inner-surface side of the cylindrical body, the passage is required to have a high airtightness. Because of the cylindrical body, a high airtightness is ensured in the passage. The gaseous fluid flows through the porous metal body forming the first-electrode collector. As described above, since the porous metal body is discontinuously disposed at a higher density on the outlet side with respect to the middle position than on the inlet side, the pressure loss can be made low and efficient current collection can be performed.

A central conductive rod may be inserted into the cylindrical-body MEA so as to serve as an electrically conductive shaft of the porous metal body. By using the central conductive rod, the electric resistance can be decreased and an end portion of the cylindrical MEA in which the gaseous-fluid transfer passage and the external wiring are concentrated can be converged to a compact size. That is, a small and simple structure can be provided. As a result, the electric resistance in the "first electrode/first-electrode collector (including porous metal body and central conductive rod)/external wiring" can be decreased. As a result, an electrochemical reaction for gas decomposition can be promoted to enhance the treatment performance. Thus, size reduction of an apparatus including a gas decomposition component can be promoted.

The porous metal body may include a porous metal sheet wound and disposed inside the cylindrical body. The porous metal body has the shape of a sheet having a predetermined thickness; microscopically, dendritic metal forms a network structure. When the porous metal body is inserted as a first-electrode collector on the inner-surface side of the cylindrical-body MEA, the above-described sheet-shaped porous metal body is spirally wound and inserted such that the axial center of the spiral extends along the axial center of the cylindrical-body MEA. In the outer circumferential surface of the spiral porous metal body sheet, the outermost edge or the generatrix portions at predetermined positions in the spiral tend to be in contact with the inner surface of the cylinder to thereby establish electrical connection. Accordingly, the collector can be easily formed.

A start-of-winding portion of the porous metal sheet may be fixed to the central conductive rod by welding. In this case, the porous metal sheet can be easily wound around the central conductive rod. In addition, the electric resistance of the electrical connection portion between the porous metal sheet and the central conductive rod can be made low with certainty.

The porous metal body preferably includes a plurality of the porous metal sheets that have different pore sizes and are wound such that an outer porous metal sheet has a smaller pore size than an inner porous metal sheet. In this case, while the electrical connection with the first electrode is established with a low contact resistance, an increase in the pressure loss can be suppressed.

The following configuration may be employed: the metal mesh sheet is disposed between the first electrode and the porous metal body, the metal mesh sheet has a portion extending beyond an end of the MEA, and the portion extending beyond the end is electrically connected to the central conductive rod. In this case, the metal mesh sheet is disposed in parallel with the porous metal body, between the first electrode and the central conductive rod. That is, the metal mesh sheet, in parallel with the porous metal body, collects current. Accordingly, while a low electric resistance is maintained, the length of the porous metal body can be decreased and the pressure loss can be further reduced.

Electric power may be output from the first electrode and the second electrode and supplied to the heater. In this case, gas decomposition can be performed with high energy efficiency.

The gas to be decomposed may be discharged from semiconductor fabrication equipment and contain at least ammonia. In this case, oxygen ions generated in the second electrode (cathode) move to the first electrode (anode); the reaction between ammonia and oxygen ions is caused in the first electrode under the catalysis due to metal chain particles and the promotion effect due to ions; and electrons generated by the reaction can be rapidly moved. When a proton-conductive solid electrolyte such as barium zirconate is used, ammonia is decomposed in the first electrode (anode) to generate nitrogen molecules, protons, and electrons; the protons move through the solid electrolyte to the cathode; the electrons move through the external circuit to the cathode; the protons and oxygen react in the cathode to generate water.

The following configuration may be employed: a third gaseous fluid is introduced into the first electrode, a fourth gaseous fluid is introduced into the second electrode, and electric power is supplied to the first electrode and the second electrode. In this case, electric power is consumed to decompose the decomposition target gas. In this case, in the gas decomposition component, electrolysis of the gas in the third and fourth gaseous fluids is performed in the first electrode and the second electrode. Depending on the electrochemical relationship between a gas to be decomposed and a gaseous fluid ($NH_3$, volatile organic compounds (VOC), air (oxygen), $H_2O$, or the like) supplying ions participating in the electrochemical reaction, the selection between the electrolysis and the fuel cell is determined.

The gas decomposition component may function as a fuel cell for supplying electric power to an external apparatus. In this case, while a gas is detoxified, for example, power generation can be performed.

Advantageous Effects of Invention

For example, a gas decomposition component according to the present invention employs an electrochemical reaction and can have high treatment performance. In particular, by selectively disposing the porous metal body so as to have a long length in a high-temperature region, while the pressure loss is kept low, efficient current collection can be performed.

DESCRIPTION OF EMBODIMENTS

First Embodiment

Figure 1:
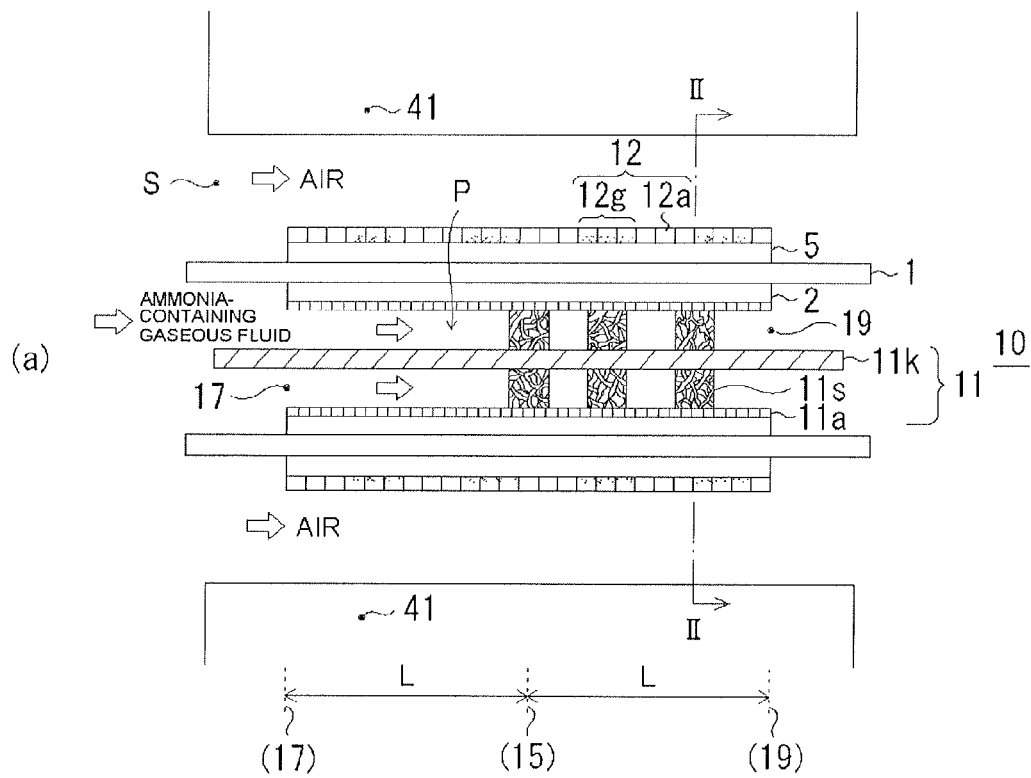
FIG. 1(a) is a longitudinal sectional view of a gas decomposition component according to a first embodiment of the present invention, in particular, an ammonia decomposition component.
FIG. 1(b) illustrates a temperature distribution in the passage in the MEA of the gas decomposition component in FIG. 1(a).
Figure 1:
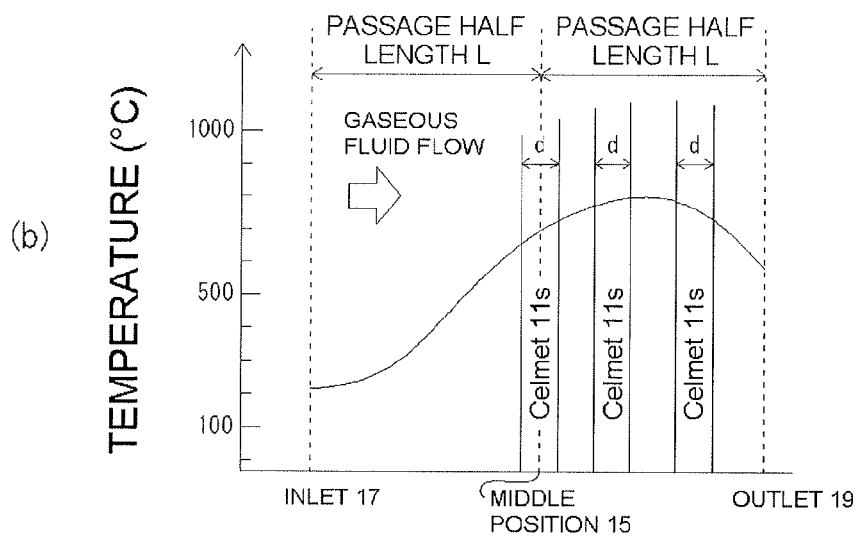

FIG. 1(a) is a longitudinal sectional view of a gas decomposition component serving as an electrochemical reaction apparatus according to a first embodiment of the present invention, in particular, an ammonia decomposition component 10. FIG. 1(b) illustrates a temperature distribution along a passage P inside a cylindrical MEA 7 in FIG. 1(a). FIG. 2 is a sectional view taken along line in FIG. 1(a).

Referring to FIGS. 1(a) and 2, in the ammonia decomposition component 10, an anode (first electrode) 2 is disposed so as to cover the inner surface of a cylindrical solid electrolyte 1; a cathode (second electrode) 5 is disposed so as to cover the outer surface of the cylindrical solid electrolyte 1; thus, a cylindrical MEA 7 (1, 2, 5) is formed.

Although the MEA is referred to as a membrane electrode assembly, the term "MEA" is continuously used in the Description.

The anode 2 may be referred to as a fuel electrode. The cathode 5 may be referred to as an air electrode. In general, the cylindrical body may have a winding shape such as a spiral shape or a serpentine shape; in FIG. 1, the cylindrical body is a right-cylindrical MEA 7. Although the cylindrical MEA has an inner diameter of, for example, about 20 mm, the inner diameter is preferably varied in accordance with apparatuses to which the MEA is applied. In the ammonia decomposition component 10 according to the present embodiment, an anode collector 11 is disposed so as to be in the inner cylinder of the cylindrical MEA 7. A cathode collector 12 is disposed so as to surround the outer surface of the cathode 5. The collectors will be described below.

<Anode Collector 11>: Ni Mesh Sheet 11a/Discontinuously Disposed Porous Metal Body 11s/Central Conductive Rod 11k A Ni mesh sheet 11a is in contact with the anode 2 disposed on the inner-surface side of the cylindrical MEA 7, to mediate electrical conduction through a porous metal body 11s to a central conductive rod 11k. The porous metal body 11s is preferably a metal-plated body, which can be formed so as to have a high porosity, such as Celmet (registered trademark: Sumitomo Electric Industries, Ltd.) for the purpose of decreasing the pressure loss of an ammonia-containing gaseous fluid described below. As described below, on the inner-surface side of the cylindrical MEA, it is important that, while the overall electric resistance of the collector 11 formed of a plurality of members is made low, the pressure loss in the passage P is made low.

<Cathode Collector 12>: Silver-Paste-Coated Wiring 12g+Ni Mesh Sheet 12a

A Ni mesh sheet 12a is in contact with the outer surface of the cylindrical MEA 7 to mediate electrical conduction to the external wiring. Silver-paste-coated wiring 12g contains silver serving as a catalyst for promoting decomposition of oxygen gas into oxygen ions in the cathode 5 and also contributes to a decrease in the electric resistance of the cathode collector 12. The cathode 5 may be formed so as to contain silver. However, the silver-paste-coated wiring 12g having predetermined properties allows passing of oxygen molecules therethrough and contact of silver particles with the cathode 5. Thus, catalysis similar to that provided by silver particles contained in the cathode 5 is exhibited. In addition, this is less expensive than the case where the cathode 5 is formed so as to contain silver particles.

The Ni mesh sheet 12a serving as the cathode collector may be plated with silver; this silver-plated layer is desirable for promoting decomposition of oxygen molecules. Since the silver-plated layer exhibits catalysis for decomposition of oxygen molecules, the silver-paste-coated wiring 12g may be omitted in some cases. Although the Ni mesh sheet itself is susceptible to oxidation, decomposition of oxygen molecules due to the silver-plated layer can suppress the oxidation.

The solid electrolyte 1 serving as a main component of the MEA is used to pass ions therethrough. When the temperature of the solid electrolyte 1 is close to room temperature, the permeation rate of ions is low and gas decomposition performance on the practical level cannot be achieved. That is, in general, the permeation amount of ions per time in the solid electrolyte 1 limits the reaction rate. Accordingly, an electrochemical reaction apparatus including the MEA 7 is heated with a heater 41 or the like to 300° C. to 1000° C. The higher the temperature, the higher the permeation rate of ions becomes. Accordingly, high temperatures are preferred; however, use of materials and structures that have high heat resistance becomes necessary, resulting in an increase in the cost. Thus, an appropriate temperature is employed. Even when the heater 41 is used for heating, because of low temperature of the gaseous fluid introduced or the influence of an end portion of the heater 41, the following temperature distribution is commonly provided in the passage P: the temperature is low in a region near the inlet, increases toward the central region, and slightly decreases in a region near the outlet. As described above, the electrochemical reaction for gas decomposition proceeds at a high reaction rate in a high-temperature region. That is, in a high-temperature region, the gas decomposition proceeds with high treatment performance. The current generated in the gas decomposition reaction also becomes large in a high-temperature region.

The porous metal body 11s, which functions as a collector, also plays a role that the gaseous fluid is prevented from passing without being treated and the gaseous fluid is brought into contact with the anode 2. To achieve both functions of current collection and prevention of the gaseous fluid from passing without being treated, the porous metal body 11s has a porosity and a pore size that are at least on the predetermined level and has an electrical conductivity that is at least on the predetermined level. However, even when the porous metal body has a porosity and a pore size that are at least on the predetermined level, the porous metal body disposed from the inlet to the outlet over the entire length of the passage P causes a serious increase in the pressure loss.

<Features in Embodiment of the Present Invention>

Referring to FIGS. 1(a) and 1(b), the porous metal body or Celmets 11s are discontinuously disposed, in the passage extending from an inlet 17 to an outlet 19, so as to be concentrated in the high-temperature region. In the temperature distribution of the MEA 7 or the passage P, the temperature is higher in the outlet-side region extending from a middle position 15 to the outlet 19 than in the inlet-side region extending from the inlet 17 to the middle position 15. Since the gaseous fluid introduced into the MEA 7 has a low temperature, a preliminary region for heating the gaseous fluid to the predetermined temperature inside the MEA 7 is required.

As illustrated in FIGS. 1(a) and 1(b), the Celmets 11s are disposed for a larger length in the high-temperature region extending from the middle position 15 to the outlet 19 than in the region extending from the inlet 17 to the middle position 15. Accordingly, the Celmets 11s are disposed so as to be concentrated in the high-temperature region in which the electrochemical reaction proceeds at a high rate. For example, when half of the length of the passage P is defined as L and the length of a Celmet is defined as d, in FIGS. 1(a) and 1(b), the Celmets 11s account for (0.5 d/L)×100% in the region extending from the inlet 17 to the middle position 15 and account for (2.5 d/L)×100% in the region extending from the middle position 15 to the outlet 19. In the latter region, the length of the Celmets 11s is five times that in the former region.

It will suffice that the total length of the Celmets 11s accounts for about 10% to about 50% of the length of the passage of the MEA 7. Specifically, for example, when the MEA 7 has a length of about 50 cm, three Celmets 11s each having a length of about 4 cm may be arranged; thus, the total length of the Celmets 11s accounts for slightly less than 25% of the length of the MEA 7.

In particular, the following configuration is preferred: the Celmets 11s are not disposed in the region near the inlet 17 in which the gaseous fluid has a low temperature, and the Celmets 11s are disposed except for the region that extends from the inlet to a position separated from the inlet by about 1/5 of the length of the passage P. This region extending for about 1/5 of the length of the passage P can be regarded as a preliminary region for achieving the maximum temperature.

As a result, compared with a conventional case where the entire passage is filled with Celmet, the pressure loss can be considerably decreased. Since the Celmets 11s are selectively disposed in a region in which the electrochemical reaction proceeds at a high rate, the electrochemical reaction proceeding at a high rate is not inhibited and a low electric resistance can be achieved. As a result, a gas decomposition component that employs an electrochemical reaction, has a small size, and has high treatment performance can be provided.

Figure 2:
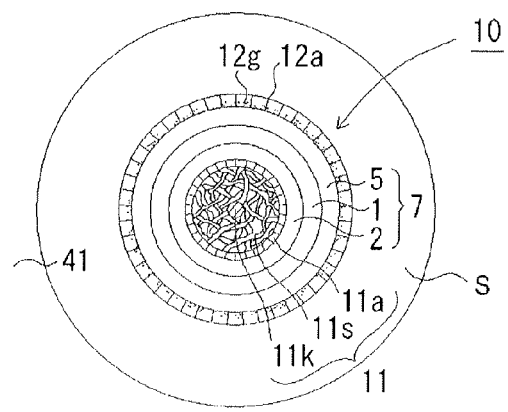
FIG. 2 is a sectional view taken along line II-II in the gas decomposition component in FIG. 1(a).
Figure 3:
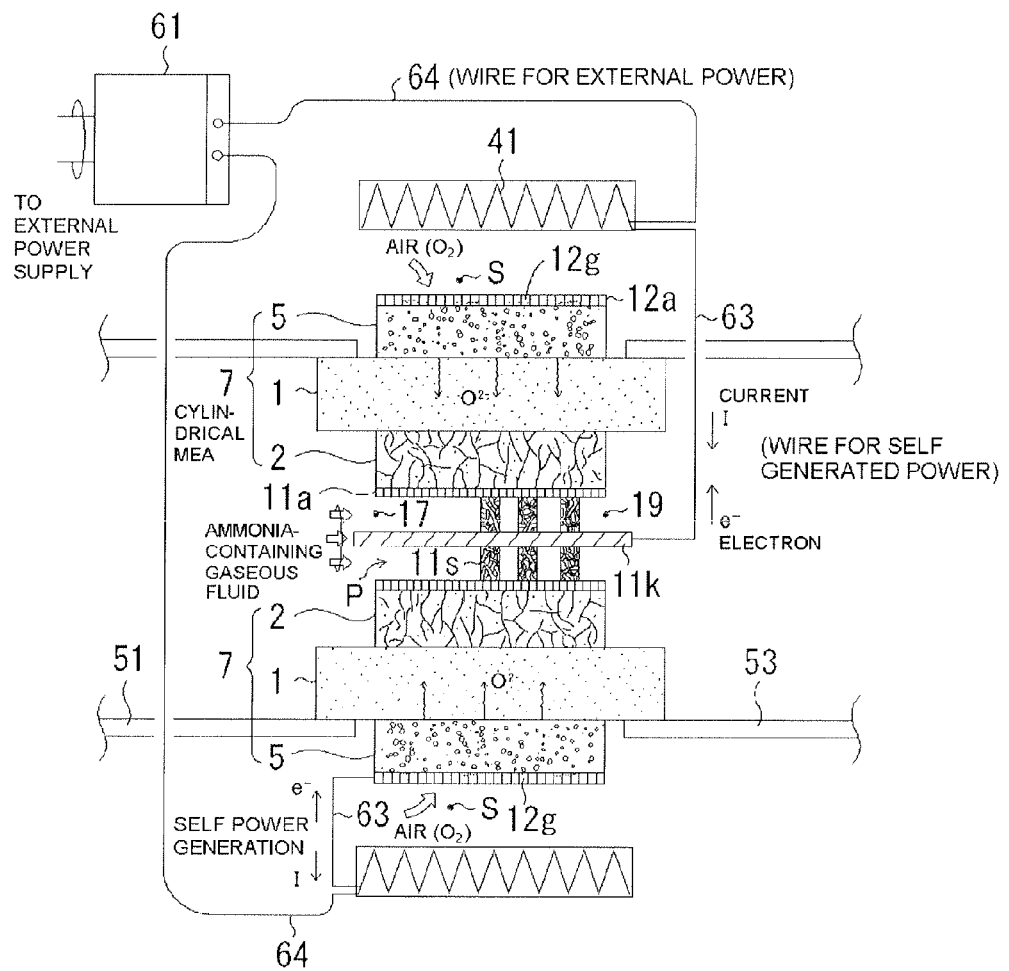
FIG. 3 illustrates the electric wiring system of the gas decomposition component in FIG. 1.

FIG. 3 illustrates the electric wiring system of the gas decomposition component 10 in FIG. 1 when the solid electrolyte is oxygen-ion conductive. An ammonia-containing gaseous fluid is introduced, in a highly airtight manner, into the inner cylinder of the cylindrical MEA 7, that is, the space where the anode collector 11 is disposed. When the cylindrical MEA 7 is used, to pass the gaseous fluid on the inner-surface side of the cylindrical MEA 7, use of the porous metal body 11s is indispensable. In view of decreasing the pressure loss, as described above, use of a metal-plated body, such as Celmet, is important.

While the ammonia-containing gaseous fluid passes through pores in the Ni mesh sheet 11a and a celmet 11s, it also comes into contact with the anode 2, resulting in an ammonia decomposition reaction described below. Oxygen ions $O^{2-}$ are generated by an oxygen gas decomposition reaction in the cathode and pass through the solid electrolyte 1 to reach the anode 2. That is, this is an electrochemical reaction in the case where oxygen ions, which are anions, move through the solid electrolyte.

(Anode reaction): $2NH_3 + 3O^{2-} \rightarrow N_2 + 3H_2O + 6e^-$

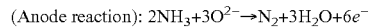

Specifically, a portion of ammonia reacts: $2NH_3 \rightarrow N_2 + 3H_2$. These $3H_2$ react with the oxygen ions $3O^{2-}$ to generate $3H_2O$.

The air, in particular, oxygen gas is passed through a space S and introduced into the cathode 5. Oxygen ions dissociated from oxygen molecules in the cathode 5 are sent to the solid electrolyte 1 toward the anode 2. The cathode reaction is as follows.

(Cathode reaction): $O_2 + 4e^- \rightarrow 2O^{2-}$

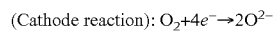

As a result of the electrochemical reaction, electric power is generated; a potential difference is generated between the anode 2 and the cathode 5; current I flows from the cathode collector 12 to the anode collector 11. When a load, such as a heater 41 for heating the gas decomposition component 10, is connected between the cathode collector 12 and the anode collector 11, electric power for the heater 41 can be supplied. This supply of electric power to the heater 41 may be a partial supply. Rather, in most cases, the amount of supply from the self power generation is equal to or lower than half of the overall electric power required for the heater.

As has already been described, the key point of the gas decomposition component above is that, in the anode 2 disposed on the inner-surface side of the cylindrical MEA, while the electric resistance of the anode collector 11 is made low, the pressure loss in the gaseous fluid passing through the anode collector 11 is made low. On the cathode side, although the air does not pass through the cylinder, the key point is that the density of contact points between the air and the cathode is made high and the resistance of the cathode collector 12 is also made low.

The above-described electrochemical reaction is one in which oxygen ions, which are anions, move through the solid electrolyte 1. In another desirable embodiment according to the present invention, for example, the solid electrolyte 1 is composed of barium zirconate ($BaZrO_3$) and a reaction is caused in which protons are generated in the anode 2 and moved through the solid electrolyte 1 to the cathode 5.

When a proton-conductive solid electrolyte 1 is used, for example, in the case of decomposing ammonia, ammonia is decomposed in the anode 2 to generate protons, nitrogen molecules, and electrons; the protons are moved through the solid electrolyte 1 to the cathode 5; and, in the cathode 5, the protons react with oxygen to generate water ($H_2O$). Since protons are smaller than oxygen ions, they move through the solid electrolyte at a higher speed than oxygen ions. Accordingly, while the heating temperature can be decreased, the decomposition capacity on the practical level can be achieved.

In addition, the solid electrolyte 1 is able to be formed so as to have a thickness providing a sufficient strength.

For example, when ammonia is decomposed with a cylindrical-body MEA, an anode is disposed inside the cylindrical-body MEA, and an oxygen-ion-conductive solid electrolyte is used, a reaction generating water occurs inside the cylindrical body (in the anode). The water takes the form of water droplets at low-temperature portions near the outlet of the cylindrical-body MEA and may cause pressure loss. In contrast, when a proton-conductive solid electrolyte is used, protons, oxygen molecules, and electrons react in the cathode (outside) to generate water. Since the outside is substantially open, even when water droplets adhere to low-temperature portions near the outlet, pressure loss is less likely to be caused.

Hereinafter, features of other portions of the gas decomposition component 10 illustrated in FIG. 1($a$) will be described.

1. Ni Mesh Sheet 11*a* of Anode Collector

The Ni mesh sheet 11*a* in the anode collector 11 in FIGS. 1($a$) and 2 is an important component that decreases the electric resistance of the anode collector 11, which contributes to a decrease in the pressure loss of the gas flow. As described above, the anode collector 11 has an electric conduction path of anode 2/Ni mesh sheet 11*a*/porous metal body (Celmet) 11*s*/central conductive rod 11*k*. Of these, the Ni mesh sheet 11*a* is not indispensable and the Ni mesh sheet may be omitted. For example, when the Ni mesh sheet 11*a* is not used, the Celmet 11*s* is in direct contact with the anode 2. In this case, a low contact resistance is less likely to be achieved as described below. The Celmet 11*s* has the shape of a sheet having a predetermined thickness; microscopically, dendritic metal forms a network structure. When the Celmet 11*s* is inserted as an anode collector on the inner-surface side of the cylindrical-body MEA, the above-described sheet-shaped Celmet is spirally wound around the central conductive rod 11*k* and inserted such that the axial center of the central conductive rod 11*k* extends along the axial center of the cylindrical-body MEA. In the outer circumferential surface of the spiral sheet, the outermost edge or the generatrix portions at predetermined positions in the spiral tend to be in contact with the inner surface of the cylinder; however, portions positioned inside relative to the above-described portions tend to be separated from the anode 2 because of the shape of not a non-concentric circle but a spiral. Accordingly, a sufficiently large contact area is less likely to be achieved between the Celmet 11*s* and the anode 2. Likewise, regarding contact pressure, a sufficiently high contact pressure can be ensured in the predetermined generatrix portions, whereas the contact pressure of portions positioned inside relative to the above-described portions becomes insufficient. Accordingly, when electrical connection is established by direct contact between the Celmet 11*s* and the anode 2, a low contact resistance is less likely to be achieved.

In contrast, by using the metal mesh sheet 11*a*, in particular, a Ni mesh sheet, the contact resistance can be decreased with certainty in the following manner. Specifically, since the Ni mesh sheet 11*a* has the shape of a single sheet, the entire circumference of the Ni mesh sheet 11*a* naturally comes in contact with the cylindrical inner surface of the first electrode. As a result of, for example, application of an external force (compressive) for filling the cylindrical body and adjustment of increasing the amount of materials for the filling, the metal mesh sheet 11*a* and the Celmet 11*s* conform to each other and protrude to the anode 2, resulting in an increase in the contact area with the anode 2. At the contact interface between the metal mesh sheet 11*a* and the Celmet 11*s*, the metal dendritic structures are pressed against each other and enter each other's pores to thereby achieve contact with each other. Accordingly, a low contact resistance is maintained.

As described above, even when a metal-plated body Celmet (registered trademark) is used as the porous metal body 11*s*, the absence of a Ni mesh sheet results in a relatively high contact resistance: the electric resistance between the cathode collector 12 and the anode collector 11 of the gas decomposition component 10 is, for example, about 4 to about 7Ω. By inserting the Ni mesh sheet 11*a* into this structure, the electric resistance can be decreased to about 1Ω or less, that is, decreased by a factor of about 4 or more.

Figure 4A:
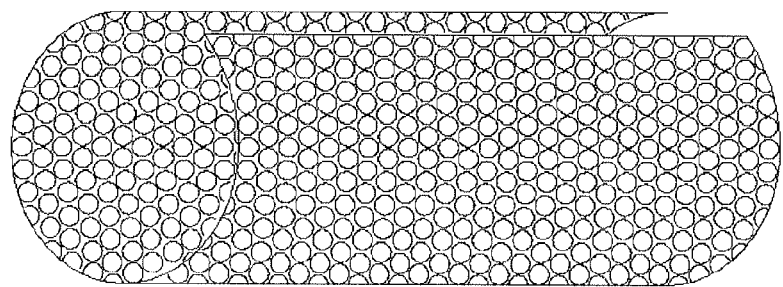
FIG. 4A illustrates a Ni mesh sheet in a gas decomposition component according to the first embodiment, the sheet having a structure formed by perforating a Ni sheet.
Figure 4B:
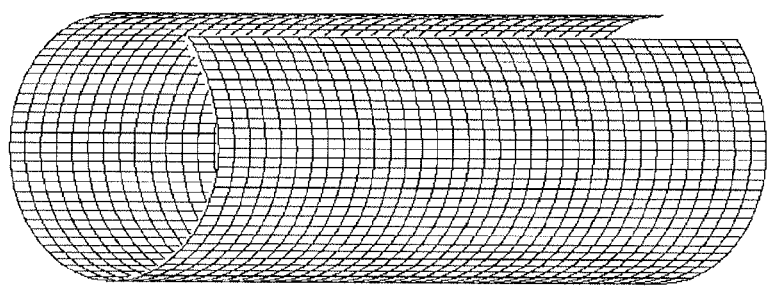
FIG. 4B illustrates a Ni mesh sheet in a gas decomposition component according to the first embodiment, the sheet having a structure formed by knitting Ni wires.

FIGS. 4A and 4B illustrate the Ni mesh sheets 11*a*. As for FIG. 4A, a single-phase Ni sheet is perforated to form the mesh structure. As for FIG. 4B, Ni wires are knitted to form the mesh structure. Both of these sheets may be used as the Ni mesh sheets 11*a*. In FIG. 4, although the Ni mesh sheets 11*a* do not have the shape of a cylinder, in the actual gas decomposition component 10, such a sheet having the shape of an incomplete cylinder whose top portion is somewhat open may be used.

The material of the metal mesh sheet is not limited to Ni. Although the metal mesh sheet may be any sheet such as a woven fabric, a nonwoven fabric, or a perforated sheet, it is preferably a woven fabric in view of, for example, flexibility and uniform distribution of pore size. Preferred examples of the metal material include Ni, Ni—Fe, Ni—Co, Ni—Cr, and Ni—W. The mesh sheet may have a structure in which a plated layer is composed of such a metal or an alloy. For example, an Fe woven fabric plated with Ni may be used; it forms an alloy by heating, that is, Ni—Fe alloy. In bonding of such a metal or an alloy to the first electrode, a reducing atmosphere for the metal forming the mesh sheet can be relatively easily achieved without employing very strict sealing conditions. Thus, reduction bonding to the first electrode can be readily performed. In particular, Ni—W and the like have excellent catalysis and can promote decomposition of, for example, ammonia.

2. Central Conductive Rod 11*k*:

The present embodiment has a feature that the MEA 7 is cylindrical and the anode collector 11 includes the central conductive rod 11*k*. The central conductive rod 11*k* is preferably formed of a metal such that at least the surface layer does not contain Cr. For example, a Ni conductive rod 11*k* is preferably used. This is because, when stainless steel containing Cr is employed, during the use, Cr poisoning inhibits the function of ceramic in the anode 2, such as gadolia-doped ceria (GDC). Although the diameter of the central conductive rod 11*k* is not particularly limited, it is preferably about ⅛ to about ⅓ of the inner diameter of the cylindrical solid electrolyte 1. For example, when the inner diameter is 18 mm, the diameter is preferably about 2 to about 6 mm. When the diameter is excessively large, the maximum gas flow rate becomes low. When the diameter is excessively small, the electric resistance becomes high, leading to a decrease in the voltage at the time of electric power generation. The porous metal body $11s$ having the shape of a sheet (Celmet sheet) is spirally tightly wound around the central conductive rod $11k$ to keep the spiral state of the porous metal body $11s$. Accordingly, the electric resistance at the interface between the porous metal body $11s$ and the central conductive rod $11k$ is low. The advantages provided by use of the central conductive rod $11k$ are as follows.

(E1) The overall electric resistance from the anode 2 to the external wiring can be decreased.

(E2) The drawback of using the existing cylindrical MEA was that the external terminal of a collector on the inner-surface side cannot be converged to a simple and small structure. For current collection on the inner-surface side of the cylindrical MEA, a porous metal body is indispensable; an end portion of the porous metal body is less likely to be converged and a terminal portion having a small size cannot be formed. For example, when an end of the porous metal is extended to achieve electrical connection with the outside, the size of the gas decomposition component itself becomes large and the commercial value of the component is considerably degraded.

In addition, in view of pressure loss, the extension of the porous metal body is not preferable.

Furthermore, since an ammonia-containing gaseous fluid is introduced into the inside of the cylindrical MEA 7, it is important to establish, in a highly airtight manner, connection between the gaseous-fluid transfer passage and the cylindrical MEA 7 and connection between the anode collector 11 and the external wiring. At an end of the cylindrical MEA 7, both of a connection portion of the anode collector to the external wiring and a connection portion to the gaseous-fluid transfer passage are provided.

The central conductive rod $11k$ can be easily processed by threading, grooving, or the like. Since the central conductive rod $11k$ is a solid rod, it does not deform by an external stress to a degree and can stably maintain its shape. As a result, the connection portion between the anode collector 11 and the external wiring can be formed so as to have a simple and small structure.

(E3) To efficiently operate the gas decomposition component 10, it needs to be heated to 300° C. to 1000° C. The position where the heater 41 for the heating can be disposed is outside the air passage. The heat propagates from the outside to the inside of the cylindrical MEA 7 and end portions of the cylindrical MEA 7 naturally have a high temperature. To connect the external wiring and the gaseous-fluid transfer passage to such a high-temperature end portion in a highly airtight manner, in view of the above-described high temperature, a special heat-resistant resin is required. In addition, for example, corrosion caused by gas tends to proceed as the temperature increases. Accordingly, in view of corrosion resistance, a special material may be required. As a result, usable resins may be limited to very expensive resins.

In contrast, when the central conductive rod $11k$ is used, it is disposed at a position farthest from the heater-41-side outside and can be easily extended in the axial direction. Accordingly, at an extension position at a relatively low temperature, the electrical connection to the external wiring and the connection to the gaseous-fluid transfer passage can be achieved in a highly airtight manner. As a result, the necessity of using special resins has been eliminated and a resin having heat resistance and corrosion resistance on the ordinary level can be used. Thus, the cost efficiency can be increased and the durability can be enhanced.

Figure 5:
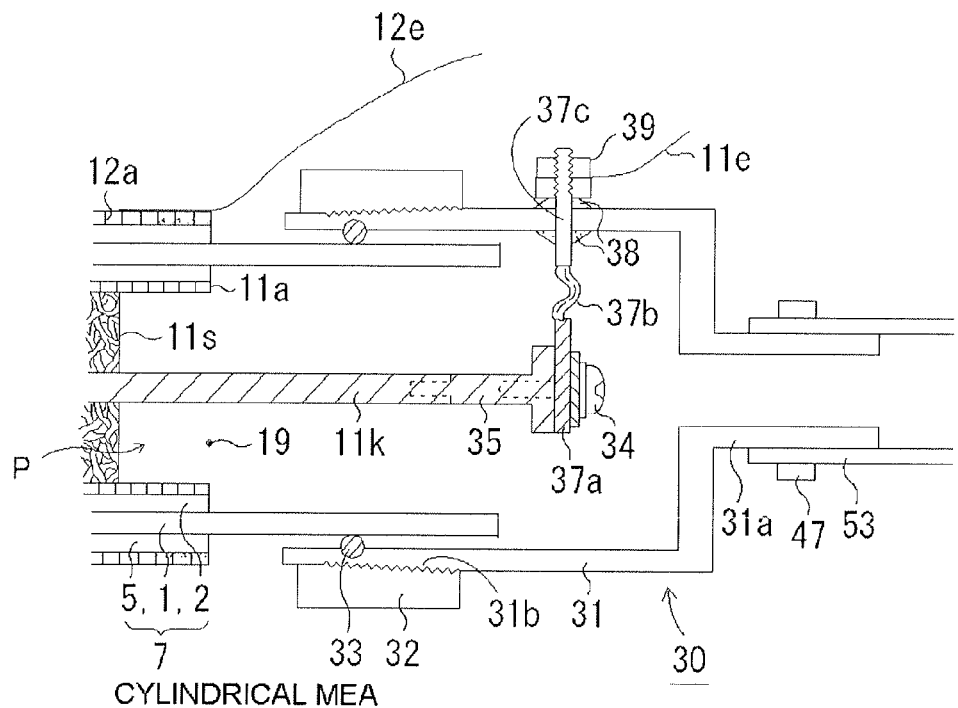
FIG. 5 illustrates a connection state of external wires and a gaseous-fluid transfer passage in an end portion of a cylindrical MEA.

FIG. 5 illustrates a connection state between the central conductive rod $11k$ and an external wire $11e$ and a connection state between the cylindrical MEA 7 and an exhaust passage after decomposition 53. A tubular joint 30 formed of a fluorocarbon resin is engaged with the end of the cylindrical MEA 7. The engagement is performed such that the following state is maintained: an O-ring 33 contained on the inner-surface side of an engagement portion $31b$ extending from a body portion 31 of the tubular joint 30 to the solid electrolyte 1 butts against the outer surface of the solid electrolyte 1 composed of a ceramic, which is a sinter. Accordingly, the engagement portion $31b$ of the tubular joint 30 is formed so as to have an outer diameter that changes in a tapered manner. The tapered portion is threaded and, to this thread, a circular nut 32 is screwed. By screwing the circular nut in the direction in which the outer diameter increases, the engagement portion $31b$ is tightened in its outer surface. Thus, the airtightness provided with the O-ring 33 can be adjusted.

In the body portion 31 of the tubular joint 30, a conductive penetration part $37c$ that penetrates the body portion 31 in an airtight manner is provided. To ensure the airtightness, for example, a sealing resin 38 is applied. The conductive penetration part $37c$ is preferably a cylindrical rod threaded for screwing a nut 39 for the purpose of ensuring electrical connection with the external wire $11e$. To the intra-tube end of the conductive penetration part $37c$, a conductive lead $37b$ is connected. Another end of the conductive lead $37b$ is connected to a connection plate $37a$.

Electrical connection between the connection plate $37a$ and a tip portion 35 of the central conductive rod $11k$ is established by using a connection tool such as a screwdriver and tightening a screw 34 with the screwdriver inserted into a protrusion hole portion $31a$ of the tubular joint 30. By tightening the screw 34 with the screwdriver, the electric resistance (contact resistance) in the electrical connection between the tip portion 35 and the connection plate $37a$ can be substantially eliminated.

By winding an external wire $12e$ around the outer circumference of an end portion of the Ni mesh sheet $12a$ of the cathode collector 12, connection to the outside can be established. Since the cathode 5 is positioned on the outer-surface side of the cylindrical MEA 7, the establishment of the connection is less difficult than that from the anode collector 11 to the outside.

The exhaust passage after decomposition 53 is preferably an elastically deformable tube composed of, for example, a resin. The tube 53 is engaged around the outer circumference of the protrusion hole portion $31a$ and fastened with a fastener 47. As a result, a connection that is highly airtight can be obtained.

In FIG. 5, both of the connection between the anode collector 11 and the external wire $11e$ and the connection between the tubular joint 30 and the exhaust passage after decomposition 53 are achieved by very simple and small structures. In addition, these two connections are disposed at positions that are separated from the main stream of thermal flow from the heater, by using the central conductive rod $11k$ and the tip portion 35 attached thereto. Accordingly, use of a fluorocarbon resin, which is an ordinary heat- or corrosion-resistant resin, can ensure durability for repeated use for a long period of time. For confirmation, it is noted that the central conductive rod $11k$ is electrically connected to the porous metal body $11s$ with a low contact resistance as described above.

3. Silver-Paste-Coated Wiring 12g

Conventionally, in general, silver particles are disposed in the cathode 5 so that catalysis by the silver particles is used to increase the decomposition rate of oxygen molecules. However, in the structure including the cathode 5 containing silver particles, the cost of the cathode 5 becomes high, resulting in a decrease in cost efficiency. Instead of forming the cathode 5 so as to contain silver particles, silver-particle wiring can be formed in the form of a silver-paste-coated layer on the outer surface of the cathode 5.

Figure 6:
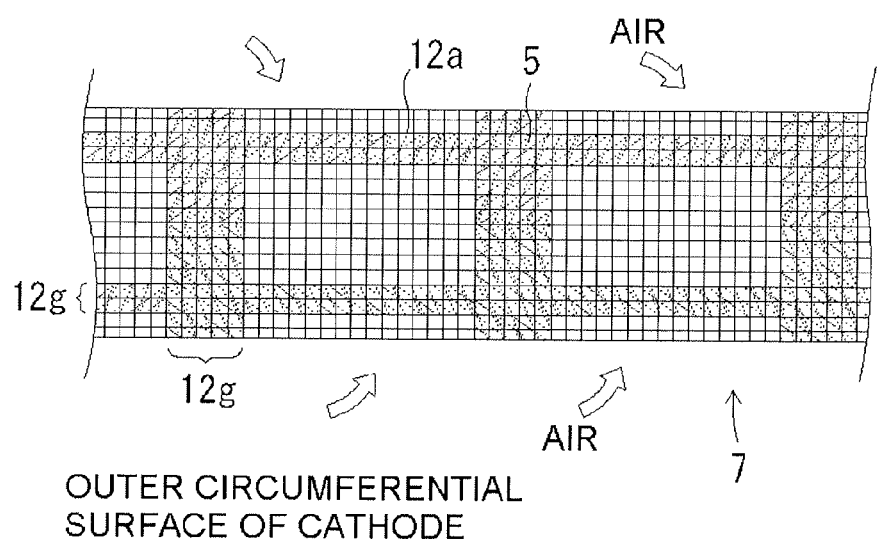
FIG. 6 illustrates silver-paste-coated wiring and a Ni mesh sheet that are disposed on the outer circumferential surface of the cylindrical cathode.

FIG. 6 illustrates the silver-paste-coated wiring 12g and the Ni mesh sheet 12a that are disposed on the outer circumferential surface of the cylindrical cathode 5. The silver-paste-coated wiring 12g may be formed by, for example, applying silver paste onto the outer circumferential surface of the cathode 5 such that band-shaped wires are disposed in a grid pattern (in the generatrix direction and in the circular direction) as illustrated in FIG. 6.

Figure 7A:
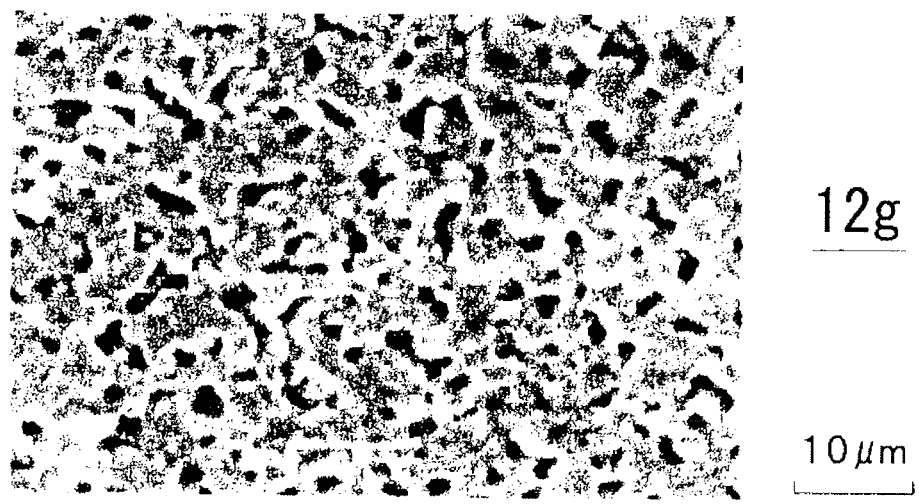
FIG. 7A is an image data, a scanning electron microscopic image illustrating the surface state of silver-paste-coated wiring.
Figure 7B:
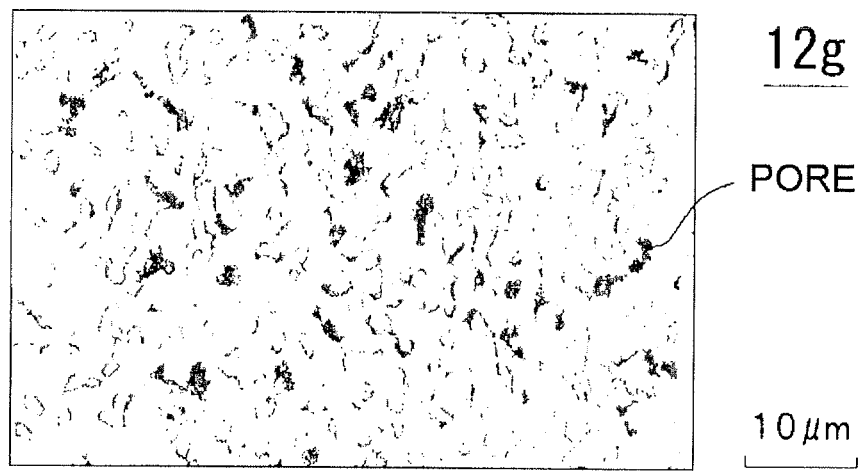
FIG. 7B is an explanatory view for FIG. 7A.

In the silver paste, it is important that the silver paste is dried or sintered so as to provide a porous structure having a high porosity. FIG. 7 are scanning electron microscopy (SEM) images illustrating the surface of the silver-paste-coated wiring 12g: FIG. 7A is an image data and FIG. 7B is an explanatory view of the image data. In FIG. 7B, black areas represent pores and the pores are in communication with one another. Silver pastes that provide a porous structure as illustrated in FIG. 7 by being applied and dried (sintered) are commercially available. For example, DD-1240 manufactured by Kyoto Elex Co., Ltd. may be used. The importance that the silver-paste-coated wiring 12g is formed so as to be porous is based on the following reason.

The amount of oxygen molecules $O_2$ supplied to the cathode 5 is preferably maximized. In addition, silver particles contained in silver paste have catalysis that promotes the cathode reaction in the cathode 5 (refer to FIG. 9). By applying the silver-paste-coated wiring 12g on the cathode 5, points (contact points) where a metal oxide that allows oxygen ions in the cathode to pass therethrough, such as lanthanum strontium manganite (LSM), silver particles, and oxygen molecules $O_2$ come into contact with each other are formed at a high density. By forming the silver-paste-coated wiring 12g so as to be porous, a large number of oxygen molecules $O_2$ enter pores of the porous structure to come into contact with the contact points, increasing the probability of the occurrence of the cathode reaction.

In addition, since the silver-paste-coated wiring 12g containing silver particles have a high conductivity, together with the Ni mesh sheet 12a, it decreases the electric resistance of the cathode collector 12. Accordingly, as described above, the silver-paste-coated wiring 12g is preferably continuously disposed in a grid pattern (in the generatrix direction and in the circular direction). The Ni mesh sheet 12a on the outer side is wound so as to be in contact with and electrically connected to the silver-paste-coated wiring 12g. This Ni mesh sheet may be the silver-plated Ni mesh sheet so as to obtain the catalytic activity of silver as described above.

In summary, by using the silver-paste-coated wiring 12g that is porous, (1) the cathode reaction can be promoted and (2) the electric resistance of the cathode collector 12 can be decreased.

The silver-paste-coated wiring 12g may be formed so as to have the shape of bands in a grid pattern as illustrated in FIG. 6 or may be formed over the entire outer circumferential surface of the cathode 5. When the silver paste is applied over the entire outer circumferential surface of the cathode 5, the term "wiring" may be awkward. However, in the present description, the term "silver-paste-coated wiring" is also used in the cases where the silver paste is applied over the entire regions of the outer circumferential surface without leaving blank regions. In such cases where the silver paste is applied over the entire outer circumferential surface of the cathode 5, the Ni mesh sheet 12a may be omitted.

Furthermore, materials forming various components and features of structures will be described. The anode 2 (first electrode) and/or the cathode 5 (second electrode) may be a sinter containing an ion-conductive ceramic and metal chain particles mainly composed of nickel (Ni).

<Anode 2>
—Configuration and Effect—

Figure 8:
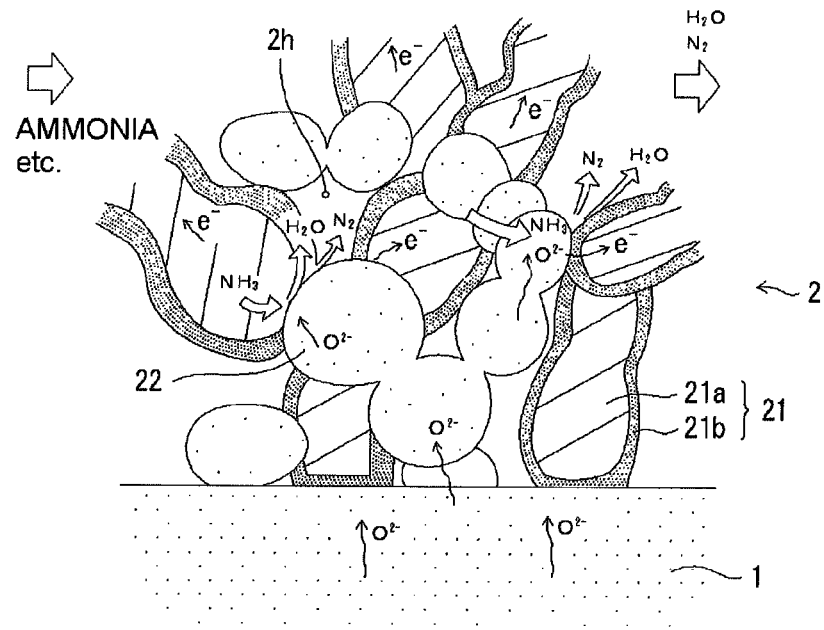
FIG. 8 is an explanatory view of an electrochemical reaction in an anode.

FIG. 8 is an explanatory view of the electrochemical reaction in the anode 2 in the case where the solid electrolyte 1 is oxygen-ion conductive. An ammonia-containing gaseous fluid is introduced into the anode 2 and flows through pores 2h. The anode 2 is a sinter mainly composed of metal chain particles 21 whose surfaces are oxidized to have oxide layers and an oxygen-ion conductive ceramic 22. Examples of the oxygen-ion conductive ceramic 22 include scandium stabilized zirconia (SSZ), yttrium stabilized zirconia (YSZ), samarium doped-ceria (SDC), lanthanum gallate (LSGM), and GDC (gadolinia doped-ceria).

The metal of the metal chain particles 21 is preferably nickel (Ni) or iron (Fe)-containing Ni. More preferably, the metal contains Ti in a trace amount, about 2 to about 10000 ppm. (1) Ni itself has catalysis that promotes decomposition of ammonia. When Ni contains a trace amount of Fe or Ti, the catalysis can be further enhanced. When such Ni is oxidized to form nickel oxide, the catalysis due to the elemental metals can be further enhanced. Note that the decomposition reaction of ammonia (anode reaction) is a reduction reaction; in the product to be used Ni chain particles have oxide layers formed by sintering or the like; as a result of use of the product, the metal chain particles in the anode are also reduced and the oxide layers are eliminated. However, Ni itself certainly has catalysis. In addition, to compensate for the lack of the oxide layers, Ni may contain Fe or Ti to compensate for the degradation of the catalysis.

In addition to the catalysis, in the anode, oxygen ions are used in the decomposition reaction. Specifically, the decomposition is performed in the electrochemical reaction. In the anode reaction $2NH_3 + 3O^{2-} \rightarrow N_2 + 3H_2O + 6e^-$, oxygen ions contribute to a considerable increase in the decomposition rate of ammonia. (3) In the anode reaction, free electrons $e^-$ are generated. When electrons $e^-$ remain in the anode 2, the occurrence of the anode reaction is inhibited. The metal chain particles 21 have the shape of an elongated string; a content 21a covered with an oxide layer 21b is composed of a metal (Ni) serving as a good conductor. Electrons $e^-$ smoothly flow in the longitudinal direction of the string-shaped metal chain particles. Accordingly, electrons $e^-$ do not remain in the anode 2 and pass through the contents 21a of the metal chain particles 21 to the outside. The metal chain particles 21 considerably facilitate passage of electrons 5. In summary, features in an embodiment of the present invention are the following (e1), (e2), and (e3) in the anode.

(e1) promotion of decomposition reaction by nickel chain particles, Fe-containing nickel chains, or Fe- and Ti-containing nickel chain particles (high catalysis)

(e2) promotion of decomposition by oxygen ions (promotion of decomposition in electrochemical reaction)

(e3) establishment of conduction of electrons with string-shaped good conductor of metal chain particles (high electron conductivity)

These (e1), (e2), and (e3) considerably promote the anode reaction.

By simply increasing the temperature and contacting with a catalyst a gas to be decomposed, decomposition of this gas proceeds. This is disclosed in literatures and well known as described above. However, as described above, in a component constituting a fuel cell, oxygen ions supplied from the cathode 5 and through the ion-conductive solid electrolyte 1 are used in the reaction and the resultant electrons are conducted to the outside; thus, the rate of the decomposition reaction is considerably increased. A big feature of the present invention is the functions (e1), (e2), and (e3) above and a configuration providing these functions.

In the above description, the case where the solid electrolyte 1 is oxygen-ion conductive is described. Alternatively, the solid electrolyte 1 may be proton ($H^+$)-conductive. In this case, the ion-conductive ceramic 22 in the anode 2 may be a proton-conductive ceramic, for example, barium zirconate.

—Mixing and Sintering—

When the oxygen-ion-conductive metal oxide (ceramic) in the anode 2 is SSZ, a SSZ raw-material powder has an average particle size of about 0.5 μm to about 50 μm. The mixing ratio (mol ratio) of the metal chain particles 21 whose surfaces are oxidized to SSZ 22 is in the range of 0.1 to 10. The mixture is sintered by, for example, being held in the air atmosphere at a temperature in the range of 1000° C. to 1600° C. for 30 to 180 minutes. The production method will be described below, in particular, in conjunction with the production method of the cylindrical MEA 7.

<Metal Chain Particles>

—Reduction Precipitation Process—

The metal chain particles 21 are preferably produced by a reduction precipitation process. This reduction precipitation process for the metal chain particles 21 is described in detail in, for example, Japanese Unexamined Patent Application Publication No. 2004-332047. The reduction precipitation process described herein employs trivalent titanium (Ti) ions as a reducing agent and precipitated metal particles (such as Ni particles) contain a trace amount of Ti. Accordingly, quantitative analysis in terms of Ti content allows identification that the particles are produced by a reduction precipitation process employing trivalent titanium ions. By changing the type of metal ions coexistent with the trivalent titanium ions, desired metal particles can be obtained; to obtain Ni particles, Ni ions are used together with the trivalent titanium ions; addition of a trace amount of Fe ions results in the formation of Ni chain particles containing a trace amount of Fe.

To form chain particles, the metal needs to be a ferromagnetic metal and also satisfy a predetermined size or more. Since Ni and Fe are ferromagnetic metals, metal chain particles can be easily formed. The requirement in terms of size needs to be satisfied during the process in which a ferromagnetic metal forms magnetic domains to cause bonding together through magnetic force and, in this bonding state, metal precipitation and subsequent growth of a metal layer are achieved to cause integration as a metal body. After metal particles having a predetermined size or more are bonded together through magnetic force, the metal precipitation continues: for example, neck portions at the boundaries between bonded metal particles grow thicker together with the other portions of the metal particles.

The metal chain particles 21 contained in the anode 2 preferably have an average diameter D of 5 nm or more and 500 nm or less, and an average length L of 0.5 μm or more and 1000 μm or less. The ratio of the average length L to the average diameter D is preferably 3 or more. Note that the metal chain particles 21 may have dimensions that do not satisfy these ranges.

—Formation of Oxide Layer—

The importance of the surface oxidation treatment slightly diminishes for the anode 2 because reduction is to be caused.

Hereinafter, such surface oxidation processes will be described. Three processes are preferred: (i) thermal oxidation by vapor-phase process, (ii) electrolytic oxidation, and (iii) chemical oxidation. In (i), a treatment is preferably performed in the air at 500° C. to 700° C. for 1 to 30 minutes; this is the simplest process; however, control of the thickness of the oxide film is less likely to be achieved. In (ii), the surface oxidation is achieved by anodic oxidation through application of an electric potential of about 3 V with respect to a standard hydrogen electrode; this process has a feature that the thickness of the oxide film can be controlled by changing the amount of electricity in accordance with a surface area; however, for a large area, a uniform oxide film is less likely to be formed. In (iii), the surface oxidation is achieved by immersion for about 1 to about 5 minutes in a solution in which an oxidizing agent such as nitric acid is dissolved; the thickness of the oxide film can be controlled by changing time, temperature, or the type of the oxidizing agent; however, washing the agent off is cumbersome. Although all these processes are preferred, (i) and (iii) are more preferred.

The oxide layer desirably has a thickness in the range of 1 nm to 100 nm, more preferably 10 nm to 50 nm. Note that the thickness may be out of such ranges. When the thickness of the oxide film is excessively small, catalysis is not sufficiently provided; in addition, metalization may be caused even in a slightly reducing atmosphere. On the other hand, when the thickness of the oxide film is excessively large, catalysis is sufficiently maintained; however, electron conductivity is degraded at the interface, resulting in degradation of electric power generation performance.

<Cathode>

—Configuration and Effect—

Figure 9:
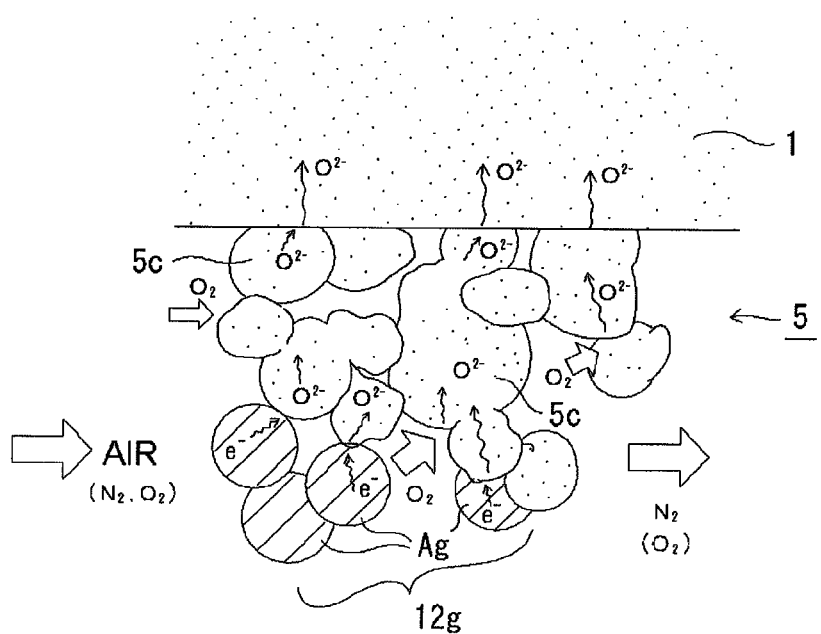
FIG. 9 is an explanatory view of an electrochemical reaction in a cathode.

FIG. 9 is an explanatory view of the electrochemical reaction in the cathode 5 in the case where the solid electrolyte 1 is oxygen-ion conductive. In the cathode 5, the air, in particular, oxygen molecules are introduced.

The cathode 5 is a sinter mainly composed of an oxygen-ion-conductive ceramic 5c. In this case, preferred examples of the oxygen-ion-conductive ceramic 5c include LSM (lanthanum strontium manganite), lanthanum strontium cobaltite (LSC), and samarium strontium cobaltite (SSC).

In the cathode 5 according to the present embodiment, Ag particles are disposed in the form of the silver-paste-coated wiring 12g. In this form, the Ag particles exhibit catalysis that considerably promotes the cathode reaction: $O_2 + 4e^- \rightarrow 2O^{2-}$. As a result, the cathode reaction can proceed at a very high rate. The Ag particles preferably have an average size of 10 nm to 100 nm.

In the above description, the case where the solid electrolyte 1 is oxygen-ion conductive is described. Alternatively, the solid electrolyte 1 may be proton ($H^+$)-conductive. In this case, the ion-conductive ceramic 52 in the cathode 5 may be a proton-conductive ceramic, preferably barium zirconate or the like.

—Sintering—

SSZ having an average size of about 0.5 μm to about 50 μm is preferably used. Sintering conditions are holding in the air atmosphere at a temperature in the range of 1000° C. to 1600° C. for about 30 to about 180 minutes.

<Solid Electrolyte>

Although the electrolyte 1 may be a solid oxide, molten carbonate, phosphoric acid, a solid polymer, or the like, the solid oxide is preferred because it can be used in a small size and easily handled. Preferred examples of the solid oxide 1 include oxygen-ion-conductive oxides such as SSZ, YSZ, SDC, LSGM, and GDC. Alternatively, as described above, proton-conductive barium zirconate may be used.

<Metal-Plated Body>

The porous metal body 11s, which is an important component of the collector for the anode 2 is preferably a metal-plated body. The porous metal body 11s is preferably a metal-plated porous body, in particular, a Ni-plated porous body, that is, Celmet (registered trademark) described above. The Ni-plated porous body can be formed so as to have a high porosity of, for example, 0.6 or more and 0.98 or less; thus, it can function as a component of the collector for the anode 2 serving as an inner-surface-side electrode and can also have very high gas permeability. When the porosity is less than 0.6, the pressure loss becomes high; when forced circulation employing a pump or the like is performed, the energy efficiency decreases and, for example, bending deformation is caused in ion-conductive members and the like, which is not preferable. To reduce the pressure loss and to suppress damage to ion-conductive members, the porosity is preferably 0.8 or more, more preferably 0.9 or more. On the other hand, when the porosity is more than 0.98, the electric conductivity becomes low and the current-collecting capability is degraded.

The three Celmets discontinuously disposed in FIG. 1 preferably have the following configuration: for example, the Celmet 11s close to the inlet 17 has a large pore size and a high porosity, whereas the Celmet close to the outlet 19 and the middle Celmet have a smaller pore size and a lower porosity than the Celmet 11s close to the inlet 17. Since the reaction proceeds at a high rate in the high-temperature region, the residence time of the gaseous fluid in this region is preferably made long.

A Celmet sheet first wound around the central conductive rod 11k preferably has a small pore size and a low porosity, and a Celmet sheet used for the outer region preferably has a larger pore size and a higher porosity than the firstly wound Celmet sheet. This is preferable for reducing pressure loss, suppressing an increase in the electric resistance, and promoting contact of the gaseous fluid with the first electrode (anode).

<Method for Producing Cylindrical MEA>

Figure 10:
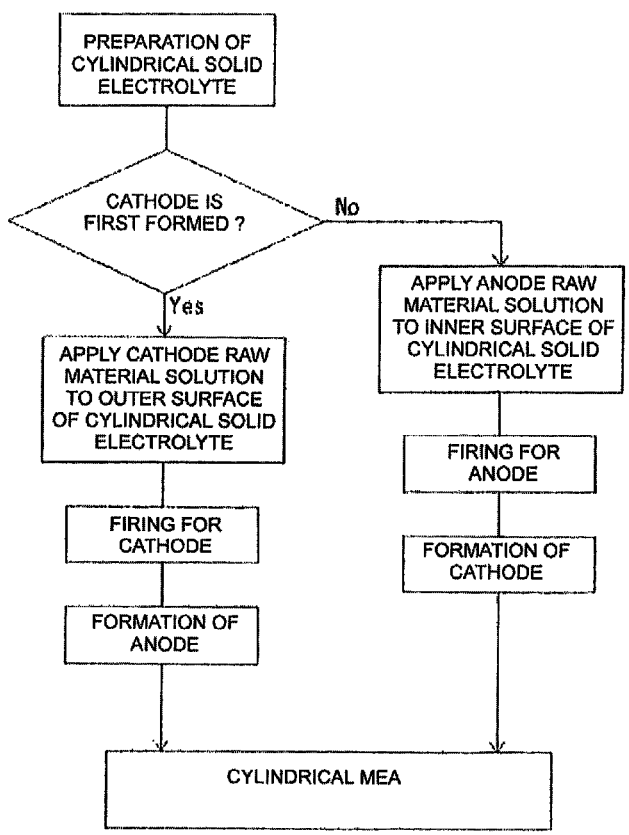
FIG. 10 is an explanatory view of a method for producing a cylindrical MEA.

Referring to FIG. 10, an overview of a method for producing the cylindrical MEA 7 will be described. FIG. 10 illustrates steps in which the anode 2 and the cathode 5 are separately fired. A cylindrical solid electrolyte 1 that is commercially available is first bought and prepared. When the cathode 5 is then formed, a solution is prepared by dissolving a cathode-forming material in a solvent to achieve a predetermined flowability; and the solution is uniformly applied to the outer surface of the cylindrical solid electrolyte. The applied solution is then fired under firing conditions suitable for the cathode 5. Subsequently, formation of the anode 2 is performed. Other than the production methods illustrated in FIG. 10, there are a large number of variations. In a case in which firing is performed only once, the firing is not performed separately for the portions as illustrated in FIG. 10, but the portions are formed in the applied state and finally the portions are fired under conditions suitable for both of the portions. In addition, there are a large number of variations. The production conditions can be determined in comprehensive consideration of, for example, materials forming the portions, a target decomposition efficiency, and production costs.

<Arrangement of Gas Decomposition Components>

Figure 11A:
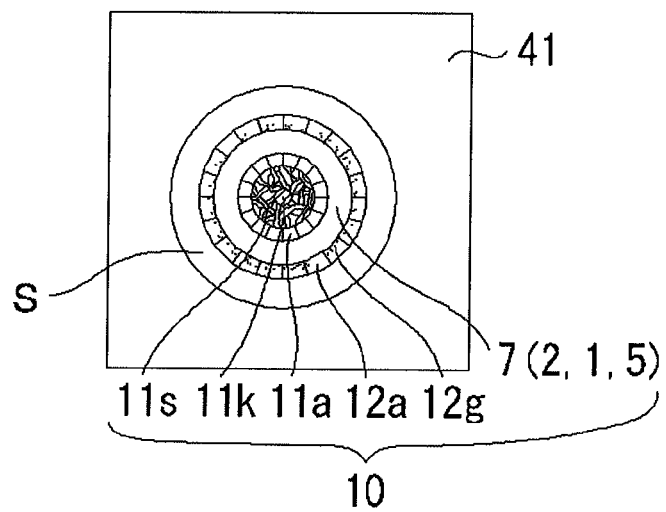
FIG. 11A illustrates a gas-decomposition-component arrangement, a configuration having a single cylindrical MEA.
Figure 11B:
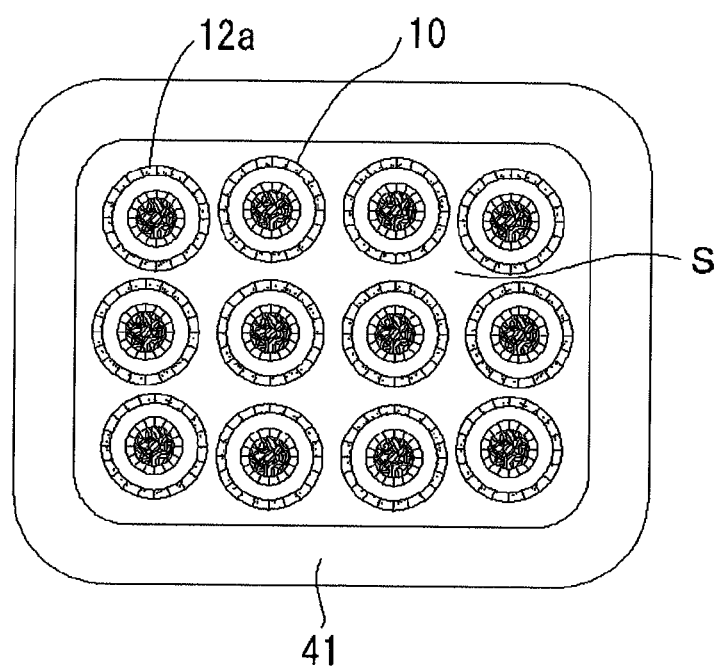
FIG. 11B illustrates a configuration in which a plurality of the structures (12 structures) in FIG. 11A are arranged in parallel.

FIG. 11 illustrate examples of the arrangement of the gas decomposition components 10. FIG. 11A illustrates a gas detoxification apparatus employing a single cylindrical MEA 7. FIG. 11B illustrates a gas detoxification apparatus having a configuration in which a plurality of the structures (12 structures) illustrated in FIG. 11A are arranged in parallel. When the treatment capacity provided by a single MEA 7 is insufficient, parallel arrangement of a plurality of the MEAs 7 allows an increase in the capacity without cumbersome processing. In each of the plurality of cylindrical MEAs 7, the anode collector 11 (11a, 11s, and 11k) is inserted on the inner-surface side and an ammonia-containing gaseous fluid is passed on the inner-surface side. On the outer-surface side of the cylindrical MEA 7, a space S is provided so that high-temperature air or high-temperature oxygen comes into contact with the outer surface.

The heater 41, which is a heating unit, may be disposed so as to bind together all the cylindrical MEAs 7 arranged in parallel. In such a configuration in which all the structures are bound together, size reduction can be achieved.

Second Embodiment

Figure 12:
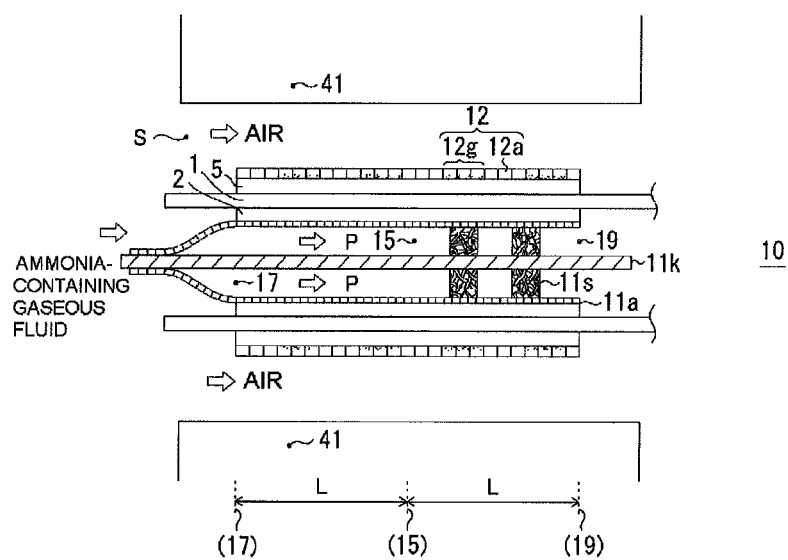
FIG. 12 is a longitudinal sectional view of a gas decomposition component according to a second embodiment of the present invention.

FIG. 12 is a longitudinal sectional view of a gas decomposition component 10 according to a second embodiment of the present invention. In the present embodiment, on an inlet-17 side, a Ni mesh sheet 11a has a portion extending beyond a MEA 7 and the portion is electrically connected to a central conductive rod 11k. In FIG. 12, the extension portion on an inlet-17 side only is electrically connected to the central conductive rod 11k; however, the electrical connection may be established on the outlet-19 side only or on both of the inlet-17 side and the outlet-19 side.

Note that a portion of the Ni mesh sheet 11a extending on the outlet-19 side interferes with the parts for external connection in FIG. 5 and hence a compact arrangement thereof is difficult. When a long extension portion on the outlet-19 side is in a low-temperature region, water ($H_2O$) generated by the reaction in the anode 2 may condense on the Ni mesh sheet 11a, resulting in an increase in the pressure loss. For this reason, in particular, when the temperature on the outlet-19 side may become low, the electrical connection of the Ni mesh sheet 11a to the central conductive rod 11k is preferably established on the inlet-17 side only.

The electrical connection can be easily established by resistance welding. In FIG. 12, the Ni mesh sheet 11a is welded to the central conductive rod 11k by resistance welding. The resistance welding may be performed by welding to the entire circumference of the central conductive rod 11k or by welding at several points with a reduced capacity of a resistance welding machine.

As a result, the Ni mesh sheet 11a is disposed in parallel with the Celmets 11s, between the anode 2 and the central conductive rod 11k. That is, the Ni mesh sheet 11a, in parallel with the Celmets 11s, collects current. Accordingly, while a low electric resistance is maintained, the length of the Celmets 11s can be decreased and the pressure loss can be further reduced. In the example in FIG. 12, the number of the Celmets 11s is decreased to two. As a result, the overall electrochemical reaction can be further promoted to enhance the treatment performance.

(Another Gas Decomposition Component)

Table I describes examples of other gas decomposition reactions to which a gas decomposition component according to the present invention can be applied. A gas decomposition reaction R1 is an ammonia/oxygen decomposition reaction described in the first embodiment. In addition, a gas decomposition component according to the present invention can be applied to all the gas decomposition reactions R2 to R8:

specifically, ammonia/water, ammonia/NOx, hydrogen/oxygen/, ammonia/carbon dioxide, VOC (volatile organic compounds)/oxygen, VOC/NOx, water/NOx, and the like. In any of the reactions, the first electrode is not limited to an anode and may be a cathode. This cathode and the other electrode are made to constitute a pair.

TABLE I

| | Item | | | |
|---|---|---|---|---|
| Number | Gas introduced into anode | Moving ion | Gas introduced into cathode | Electrochemical reaction |
| R1 | $NH_3$ | $O^{2-}$ | $O_2$ | Power generation |
| R2 | $NH_3$ | $O^{2-}$ | $H_2O$ | Power generation |
| R3 | $NH_3$ | $O^{2-}$ | $NO_2$, NO | Power generation |
| R4 | $H_2$ | $O^{2-}$ | $O_2$ | Power generation |
| R5 | $NH_3$ | $O^{2-}$ | $CO_2$ | Electrolysis (supply of electric power) |
| R6 | VOC such as $CH_4$ | $O^{2-}$ | $O_2$ | Power generation |
| R7 | VOC such as $CH_4$ | $O^{2-}$ | $NO_2$, NO | Electrolysis (supply of electric power) |
| R8 | $H_2O$ | $O^{2-}$ | $NO_2$, NO | Electrolysis (supply of electric power) |

Table I merely describes several examples of a large number of electrochemical reactions. A gas decomposition component according to the present invention is also applicable to a large number of other reactions. For example, the reaction examples in Table I are limited to examples in which oxygen-ion-conductive solid electrolytes are employed. However, as described above, reaction examples in which proton ($H^+$)-conductive solid electrolytes are employed are also major embodiments of the present invention. Even when a proton-conductive solid electrolyte is employed, in the combinations of gases described in Table I, the gas molecules can be finally decomposed, though the ion species passing through the solid electrolyte is proton. For example, in the reaction (R1), in the case of a proton-conductive solid electrolyte, ammonia ($NH_3$) is decomposed in the anode into nitrogen molecules, protons, and electrons; the protons move through the solid electrolyte to the cathode; the electrons move through the external circuit to the cathode; and, in the cathode, oxygen molecules, the electrons, and the protons generate water molecules. In view of the respect that ammonia is finally combined with oxygen molecules and decomposed, this case is the same as the case where an oxygen-ion-conductive solid electrolyte is employed.

Other Application Examples

The above-described electrochemical reactions are gas decomposition reactions intended for gas detoxification. There are also gas decomposition components whose main purpose is not gas detoxification. A gas decomposition component according to the present invention is also applicable to such electrochemical reaction apparatuses, such as fuel cells.

Embodiments of the present invention have been described so far. However, embodiments of the present invention disclosed above are given by way of illustration, and the scope of the present invention is not limited to these embodiments. The scope of the present invention is indicated by Claims and embraces all the modifications within the meaning and range of equivalency of the Claims.

INDUSTRIAL APPLICABILITY

A gas decomposition component according to the present invention can provide a apparatus in which an electrochemical reaction is used to reduce the running cost and high treatment performance can be achieved. In particular, an ammonia decomposition component having a cylindrical MEA for ammonia is small but has high treatment performance and also has high durability even in high-temperature use for ensuring treatment capacity.

1 solid electrolyte
2 anode
2h pore in anode
5 cathode
5c ion-conductive ceramic in cathode
10 gas decomposition component
11 anode collector
11a Ni mesh sheet
11e anode external wire
11g Ni paste layer
11k central conductive rod
11s porous metal body (metal-plated body)
12 cathode collector
12a Ni mesh sheet
12e cathode external wire
12g silver-paste-coated wiring
15 middle position of passage
17 inlet
19 outlet
21 metal chain particle
21a core portion (metal portion) of metal chain particle
21b oxide layer
22 ion-conductive ceramic in anode
30 tubular joint
31 body portion of tubular joint
31a protrusion hole portion
31b engagement portion
32 circular nut
33 O-ring
34 screw
35 tip portion of central conductive rod
37a connection plate
37b conductive lead
37c conductive penetration part
39 nut
47 fastener
41 heater
51 exhaust passage before decomposition
53 exhaust passage after decomposition
61 control panel
63 wire for generated power
64 wire for external power
S air space
d length of Celmet (porous metal body)
P passage
S air space

The invention claimed is:

1. A gas decomposition component used for decomposing a gas, comprising:
   a membrane electrode assembly (MEA) including a solid electrolyte and a first electrode and a second electrode that are disposed so as to sandwich the solid electrolyte;
   a porous metal body electrically connected to the first electrode or the second electrode;
   a heater that heats the MEA; and
   an inlet through which a gaseous fluid containing the gas is introduced into the MEA, an outlet through which the gaseous fluid having passed through the MEA is discharged, and a passage extending between the inlet and the outlet, wherein the porous metal body is discontinuously disposed along the passage and, with respect to a middle position of the passage, a length of the porous metal body disposed is larger on a side of the outlet than on a side of the inlet.

2. The gas decomposition component according to claim 1, wherein the porous metal body is disposed in a region that is separated from the inlet by at least $1/5$ or more of a total length of the passage.

3. The gas decomposition component according to claim 1, wherein the porous metal body discontinuously disposed has a total length that is $1/10$ to $5/10$ of a total length of the passage.

4. The gas decomposition component according to claim 1, wherein the porous metal body discontinuously disposed has different average pore sizes depending on positions where the porous metal body is disposed.

5. The gas decomposition component according to claim 1, wherein the porous metal body is a metal-plated body.

6. The gas decomposition component according to claim 1, wherein a metal mesh sheet and/or metal paste is disposed between the first electrode or the second electrode and the porous metal body.

7. The gas decomposition component according to claim 1, wherein the MEA has a cylindrical body; the first electrode is disposed on an inner-surface side of the cylindrical body and the second electrode is disposed on an outer-surface side of the cylindrical body; the first electrode faces the passage; and the porous metal body is disposed in the passage, as a collector for the first electrode.

8. The gas decomposition component according to claim 7, further comprising a central conductive rod inserted into the cylindrical-body MEA so as to serve as an electrically conductive shaft of the porous metal body.

9. The gas decomposition component according to claim 8, wherein the porous metal body includes a porous metal sheet wound around the central conductive rod and disposed inside the cylindrical body.

10. The gas decomposition component according to claim 9, wherein a start-of-winding portion of the porous metal sheet is fixed to the central conductive rod by welding.

11. The gas decomposition component according to claim 9, wherein the porous metal body includes a plurality of the porous metal sheets that have different pore sizes and are wound such that an outer porous metal sheet has a smaller pore size than an inner porous metal sheet.

12. The gas decomposition component according to claim 8, wherein the metal mesh sheet is disposed between the first electrode and the porous metal body, the metal mesh sheet has a portion extending beyond an end of the MEA, and the portion extending beyond the end is electrically connected to the central conductive rod.

13. The gas decomposition component according to claim 1, wherein electric power is output from the first electrode and the second electrode and supplied to the heater.

14. The gas decomposition component according to claim 1, wherein the gas to be decomposed is discharged from semiconductor fabrication equipment and contains at least ammonia.

15. The gas decomposition component according to claim 1, wherein a third gaseous fluid is introduced into the first electrode, a fourth gaseous fluid is introduced into the second electrode, and electric power is supplied to the first electrode and the second electrode.

16. The gas decomposition component according to claim 1, wherein the gas decomposition component is configured to function as a fuel cell for supplying electric power to an external apparatus.

* * * * *